United States Patent
Qiu et al.

(10) Patent No.: US 8,355,440 B2
(45) Date of Patent: Jan. 15, 2013

(54) MOTION SEARCH MODULE WITH HORIZONTAL COMPRESSION PREPROCESSING AND METHODS FOR USE THEREWITH

(75) Inventors: Gang Qiu, Richmond Hill (CA); Xu Gang (Wilf) Zhao, Toronto (CA); Xinghai Li, North York (CA)

(73) Assignee: ViXS Systems, Inc., Toronto, Ontario (CA)

( * ) Notice: Subject to any disclaimer, the term of this patent is extended or adjusted under 35 U.S.C. 154(b) by 1927 days.

(21) Appl. No.: 11/500,808

(22) Filed: Aug. 7, 2006

(65) Prior Publication Data
US 2008/0031334 A1    Feb. 7, 2008

(51) Int. Cl.
*H04N 7/12* (2006.01)
*H04N 11/02* (2006.01)
*H04N 11/04* (2006.01)

(52) U.S. Cl. ......... 375/240.16; 375/240.12; 375/240.13; 348/14.13; 348/402.1; 348/413.1; 348/568; 348/699; 382/235; 382/243; 382/244

(58) Field of Classification Search .................. 375/240, 375/240.01–240.29, 40.17; 708/490; 348/14.13, 348/402.1, 413.1, 568, 699; 382/235, 243, 382/244
See application file for complete search history.

(56) References Cited

U.S. PATENT DOCUMENTS

| | | | | |
|---|---|---|---|---|
| 6,421,698 | B1 * | 7/2002 | Hong | 708/490 |
| 2002/0181592 | A1 * | 12/2002 | Gagarin et al. | 375/240.18 |
| 2003/0156648 | A1 * | 8/2003 | Holcomb et al. | 375/240.18 |
| 2003/0179826 | A1 * | 9/2003 | Jeon | 375/240.15 |
| 2006/0256866 | A1 * | 11/2006 | Ziauddin et al. | 375/240.15 |

\* cited by examiner

*Primary Examiner* — Sath V Perungavoor
*Assistant Examiner* — Nathnael Aynalem
(74) *Attorney, Agent, or Firm* — Garlick & Markison; Bruce E. Stuckman

(57) ABSTRACT

A motion compensation module, that can be used in a video encoder for encoding a video input signal, includes a motion search module that generates a motion search motion vector for each motion search macroblock of a plurality of motion search macroblocks in at least one of a horizontally compressed and vertically uncompressed field of the video input signal and a horizontally compressed and vertically uncompressed frame of the video input signal. A motion refinement module generates a refined motion vector for each motion refinement macroblock of a plurality of macroblocks of at least one of an uncompressed field of the video input signal and an uncompressed frame of the video input signal, based on the motion search motion vector.

26 Claims, 8 Drawing Sheets

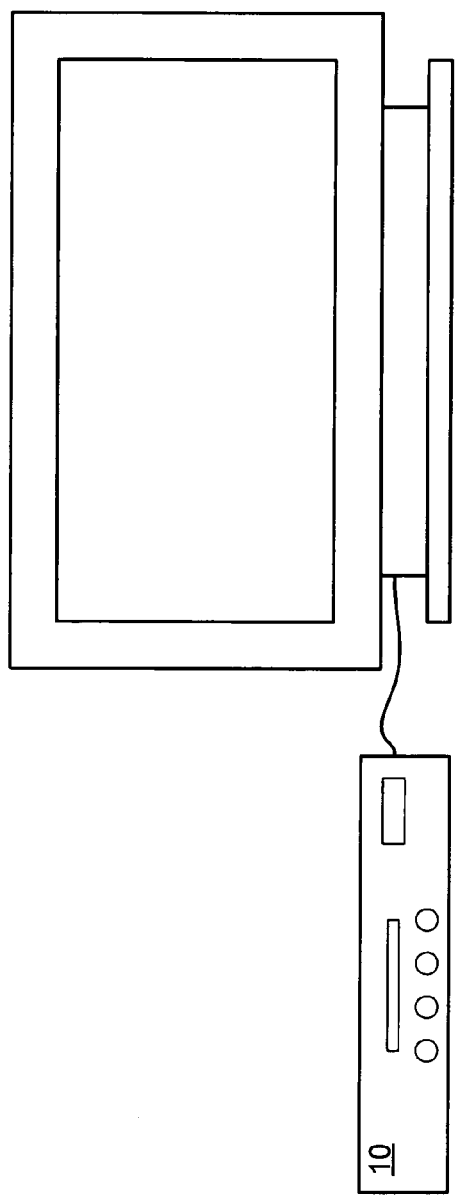
FIG. 1
FIG. 3
FIG. 2

MOTION SEARCH MODULE WITH HORIZONTAL COMPRESSION PREPROCESSING AND METHODS FOR USE THEREWITH

TECHNICAL FIELD OF THE INVENTION

The present invention relates to motion compensation and related methods used in devices such as video encoders/codecs.

DESCRIPTION OF RELATED ART

Video encoding has become an important issue for modern video processing devices. Robust encoding algorithms allow video signals to be transmitted with reduced bandwidth and stored in less memory. However, the accuracy of these encoding methods face the scrutiny of users that are becoming accustomed to greater resolution and higher picture quality. Standards have been promulgated for many encoding methods including the H.264 standard that is also referred to as MPEG-4, part 10 or Advanced Video Coding, (AVC). While this standard sets forth many powerful techniques, further improvements are possible to improve the performance and speed of implementation of such methods.

Further limitations and disadvantages of conventional and traditional approaches will become apparent to one of ordinary skill in the art through comparison of such systems with the present invention.

BRIEF DESCRIPTION OF THE SEVERAL VIEWS OF THE DRAWINGS

FIGS. 1-3 present pictorial diagram representations of a various video processing devices in accordance with embodiments of the present invention.

DETAILED DESCRIPTION OF THE INVENTION INCLUDING THE PRESENTLY PREFERRED EMBODIMENTS

FIGS. 1-3 present pictorial diagram representations of a various video processing devices in accordance with embodiments of the present invention. In particular, set top box 10 with built-in digital video recorder functionality or a stand alone digital video recorder, computer 20 and portable computer 30 illustrate electronic devices that incorporate a video processing device 125 that includes one or more features or functions of the present invention. While these particular devices are illustrated, video processing device 125 includes any device that is capable of encoding video content in accordance with the methods and systems described in conjunction with FIGS. 4-10 and the appended claims.

Figure 4:
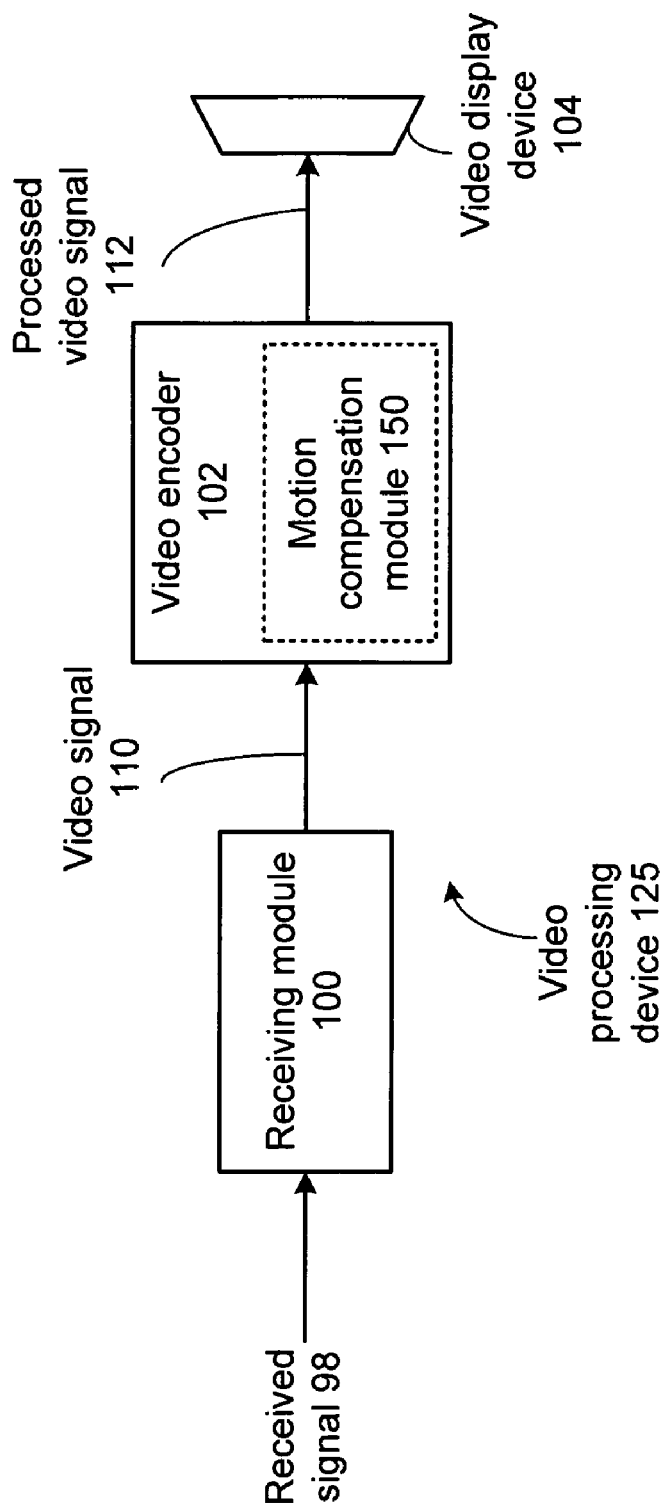
FIG. 4 presents a block diagram representation of a video processing device 125 in accordance with an embodiment of the present invention.

FIG. 4 presents a block diagram representation of a video processing device 125 in accordance with an embodiment of the present invention. In particular, video processing device 125 includes a receiving module 100, such as a television receiver, cable television receiver, satellite broadcast receiver, broadband modem, 3G transceiver or other information receiver or transceiver that is capable of receiving a received signal 98 and extracting one or more video signals 110 via time division demultiplexing, frequency division demultiplexing or other demultiplexing technique. Video encoding module 102 is coupled to the receiving module 100 to encode or transcode the video signal in a format corresponding to video display device 104.

In an embodiment of the present invention, the received signal 98 is a broadcast video signal, such as a television signal, high definition television signal, enhanced high definition television signal or other broadcast video signal that has been transmitted over a wireless medium, either directly or through one or more satellites or other relay stations or through a cable network, optical network or other transmission network. In addition, received signal 98 can be generated from a stored video file, played back from a recording medium such as a magnetic tape, magnetic disk or optical disk, and can include a streaming video signal that is transmitted over a public or private network such as a local area network, wide area network, metropolitan area network or the Internet.

Video signal 110 can include an analog video signal that is formatted in any of a number of video formats including National Television Systems Committee (NTSC), Phase Alternating Line (PAL) or Sequentiel Couleur Avec Memoire (SECAM). Processed video signal includes 112 a digital video codec standard such as H.264, MPEG-4 Part 10 Advanced Video Coding (AVC) or other digital format such as a Motion Picture Experts Group (MPEG) format (such as MPEG1, MPEG2 or MPEG4), Quicktime format, Real Media format, Windows Media Video (WMV) or Audio Video Interleave (AVI), or another digital video format, either standard or proprietary.

Video display devices 104 can include a television, monitor, computer, handheld device or other video display device that creates an optical image stream either directly or indirectly, such as by projection, based on decoding the processed video signal 112 either as a streaming video signal or by playback of a stored digital video file.

Video encoder 102 includes a motion compensation module 150 that operates in accordance with the present invention and, in particular, includes many optional functions and features described in conjunction with FIGS. 5-10 that follow.

Figure 5:
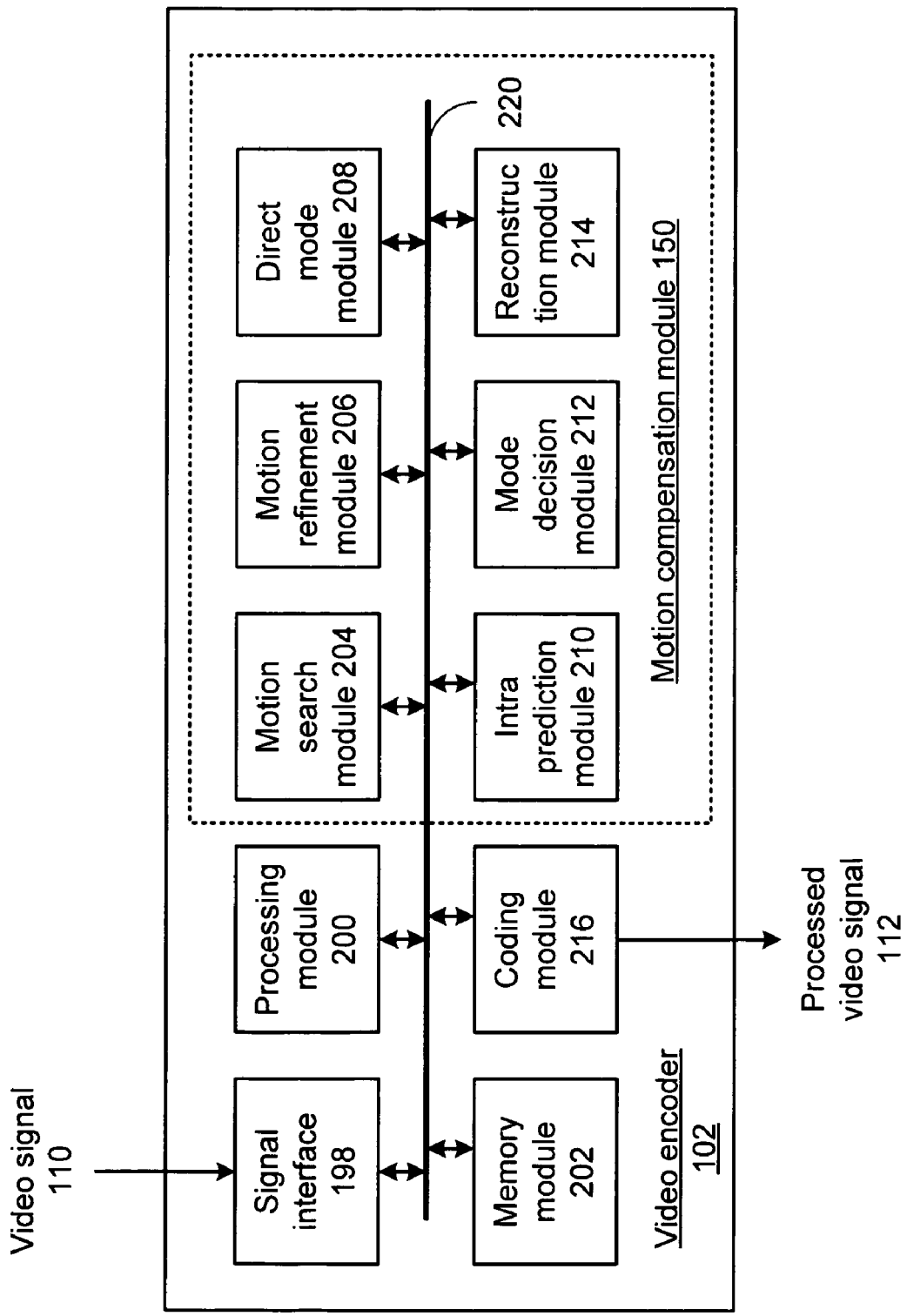
FIG. 5 presents a block diagram representation of a video encoder 102 that includes motion compensation module 150 in accordance with an embodiment of the present invention.

FIG. 5 presents a block diagram representation of a video encoder 102 that includes motion compensation module 150 in accordance with an embodiment of the present invention. In particular, video encoder 102 operates in accordance with many of the functions and features of the H.264 standard, the MPEG-4 standard, VC-1 (SMPTE standard 421M) or other standard, to encode a video input signal 110 that is converted to a digital format via a signal interface 198.

The video encoder 102 includes a processing module 200 that can be implemented using a single processing device or a plurality of processing devices. Such a processing device may be a microprocessor, co-processors, a micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions that are stored in a memory, such as memory module 202. Memory module 202 may be a single memory device or a plurality of memory devices. Such a memory device can include a hard disk drive or other disk drive, read-only memory, random access memory, volatile memory, non-volatile memory, static memory, dynamic memory, flash memory, cache memory, and/or any device that stores digital information. Note that when the processing module implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry.

Processing module 200, and memory module 202 are coupled, via bus 220, to the signal interface 198 and a plurality of other modules, such as motion search module 204, motion refinement module 206, direct mode module 208, intra-prediction module 210, mode decision module 212, reconstruction module 214 and coding module 216. The modules of video encoder 102 can be implemented in software, firmware or hardware, depending on the particular implementation of processing module 200. It should also be noted that the software implementations of the present invention can be stored on a tangible storage medium such as a magnetic or optical disk, read-only memory or random access memory and also be produced as an article of manufacture. While a particular bus architecture is shown, alternative architectures using direct connectivity between one or more modules and/or additional busses can likewise be implemented in accordance with the present invention.

Motion compensation module 150 includes a motion search module 204 that processes pictures from the video input signal 110 based on a segmentation into macroblocks of pixel values (such as of 16 pixels by 16 pixels size, 8 pixels by 16 pixels size, 4 pixels by 16 pixels size or other size) from the columns and rows of a frame and/or field of the video input signal 110. In an embodiment of the present invention, the motion search module determines, for each macroblock or macroblock pair of a field and/or frame of the video signal a motion vector that represents the displacement of the macroblock from a reference frame or reference field of the video signal to a current frame or field. In operation, the motion search module operates within a search range to locate a macroblock in the current frame or field to an integer pixel level accuracy such as to a resolution of 1-pixel. Candidate locations are evaluated based on a cost formulation to determine the location and corresponding motion vector that have a most favorable (such as lowest) cost.

In an embodiment of the present invention, a cost formulation is based on the sum of the Sum of Absolute Difference (SAD) between the reference macroblock and candidate macroblock pixel values, however other terms such as a weighted rate term that represents the number of bits required to be spent on coding the difference between the candidate motion vector and an estimated predicted motion vector that is determined based on motion vectors from neighboring macroblocks of a prior row of the video input signal—and not based on motion vectors from neighboring macroblocks of the row of the current macroblock. The use of motion vectors from the current row, the motion search module can optionally operate on an entire row of video input signal 110 in parallel, to contemporaneously determine the motion search motion vector for each macroblock in the row.

In accordance with the present invention, the motion search module 204 can operate in a frame mode, in a field mode or a combined frame and field mode (such as the motion adaptive frame and field mode set forth in the H.264 standard) to generate a motion search motion vector for each motion search macroblock of a plurality of motion search macroblocks in either a horizontally compressed and vertically uncompressed field of the video input signal or a horizontally compressed and vertically uncompressed frame of the video input signal. In particular, the motion search module 204 can generate the motion search motion vector for each motion search macroblock of the plurality of motion search macroblocks based on a horizontally compressed and vertically uncompressed current field of the video input signal and a horizontally compressed and vertically uncompressed reference field of the video input signal. Further, the motion search module 204 can generate the motion search motion vector for each motion search macroblock of the plurality of motion search macroblocks based on a horizontally compressed and vertically uncompressed current frame of the video input signal and a horizontally compressed and vertically uncompressed reference frame of the video input signal. In this fashion, the motion search module can determine the motion search motion vector for each macroblock based on a frame-to-frame comparison, a field-to-field comparison or optionally the best match between either frame-to-frame or field-to-field.

Prior art algorithms that include compression preprocessing compress the reference frames not only horizontally but also vertically. These algorithms ordinarily work well when only progressive frames or only field pictures are involved. But in practical scenarios, the video input signal 110 can include progressive video or interlaced video, even mixed progressive and interlaced video. Since the signal type often cannot be known in advance, the compression method is hard to choose. For example, the frames can be vertically compressed by averaging every pair of adjacent lines. This approach works well for progressive videos. But if the video input signal 110 includes interlaced video, the difference between the top field and the bottom field will virtually be eliminated. This use of vertical compression will result in significant accuracy loss for field motion vectors. In order to preserve the difference between fields, another choice is to average the odd lines and even lines of the frames separately. But the resulting coarser reference frame often results in inaccurate frame motion vectors. Considering this dilemma, even a careful choice of the vertical compression often achieves undesirable results.

In the present invention however, the coarser resolution generated by the preprocessing the frames and or fields of the video input signal 110 into horizontally compressed frames and/or fields allows the motion search module 204 to operate faster and/or cover a larger search area without increasing the number of matching operations and bandwidth, etc. Leaving the vertical dimension uncompressed allows the motion search module 204 to operate more accurately in either frame or field mode since the coarse-resolution field reference can be drawn from the course frame by using every other line.

A motion refinement module 206 generates a refined motion vector for each macroblock of the plurality of macroblocks, based on the motion search motion vector. In an embodiment of the present invention, the motion refinement module determines, for each macroblock or macroblock pair of an uncompressed field and/or frame of the video input signal 110 a refined motion vector that represents the displacement of the macroblock from a reference frame or reference field of the video signal to a current frame or field. In operation, the motion refinement module refines the location of the macroblock in the current frame or field to a greater pixel level accuracy such as full pixel, ½-pixel, ¼-pixel resolution, etc. Candidate locations are also evaluated based on a cost formulation to determine the location and refined motion vector that have a most favorable (such as lowest) cost. As in the case with the motion search module, a cost formulation is based on the a sum of the Sum of Absolute Difference (SAD) between the reference macroblock and candidate macroblock pixel values and can also include a weighted rate term that represents the number of bits required to be spent on coding the difference between the candidate motion vector and an estimated predicted motion vector that is calculated based on motion vectors from neighboring macroblocks of a prior row of the video input signal—and not based on motion vectors from neighboring macroblocks of the row of the current macroblock. Because the cost formulation avoids the use of motion vectors from the current row, the motion refinement module can operate on an entire row of video input signal 110 in parallel, to contemporaneously determine the refined motion vector for each macroblock in the row. In this fashion the motion search module 204 and the motion refinement module 206 can be pipelined and operate in parallel to process each of the plurality of macroblocks in the row of the video input signal 110.

A direct mode module 208 generates a direct mode motion vector for each macroblock of the plurality of macroblocks, based on a plurality of macroblocks that neighbor the macroblock of pixels. In an embodiment of the present invention, the direct mode module 208 operates in a fashion such as defined by the H.264 standard to determine the direct mode motion vector and the cost associated with the direct mode motion vector.

While the prior modules have focused on inter-prediction of the motion vector, intra-prediction module 210 generates a best intra prediction mode for each macroblock of the plurality of macroblocks. In particular, intra-prediction module 210 operates in a fashion such as defined by the H.264 standard to evaluate a plurality of intra prediction modes to determine the best intra prediction mode and the associated cost.

A mode decision module 212 determines a final motion vector for each macroblock of the plurality of macroblocks based on costs associated with the refined motion vector, the direct mode motion vector, and the best intra prediction mode, and in particular, the method that yields the most favorable (lowest) cost, or otherwise an acceptable cost. A reconstruction module 214 generates residual luma and chroma pixel values corresponding to the final motion vector for each macroblock of the plurality of macroblocks.

A coding module 216 of video encoder 102 generates processed video signal 112 by transforming coding and quantizing the motion vector and residual pixel values into quantized transformed coefficients that can be further coded, such as by entropy coding, to be transmitted and/or stored as the processed video signal 112.

While not expressly shown, video encoder 102 can include a memory cache, a memory management module, a filter module, such as an in-loop deblocking filter, comb filter or other video filter, and/or other module to support the encoding of video input signal 110 into processed video signal 112.

Figure 6:
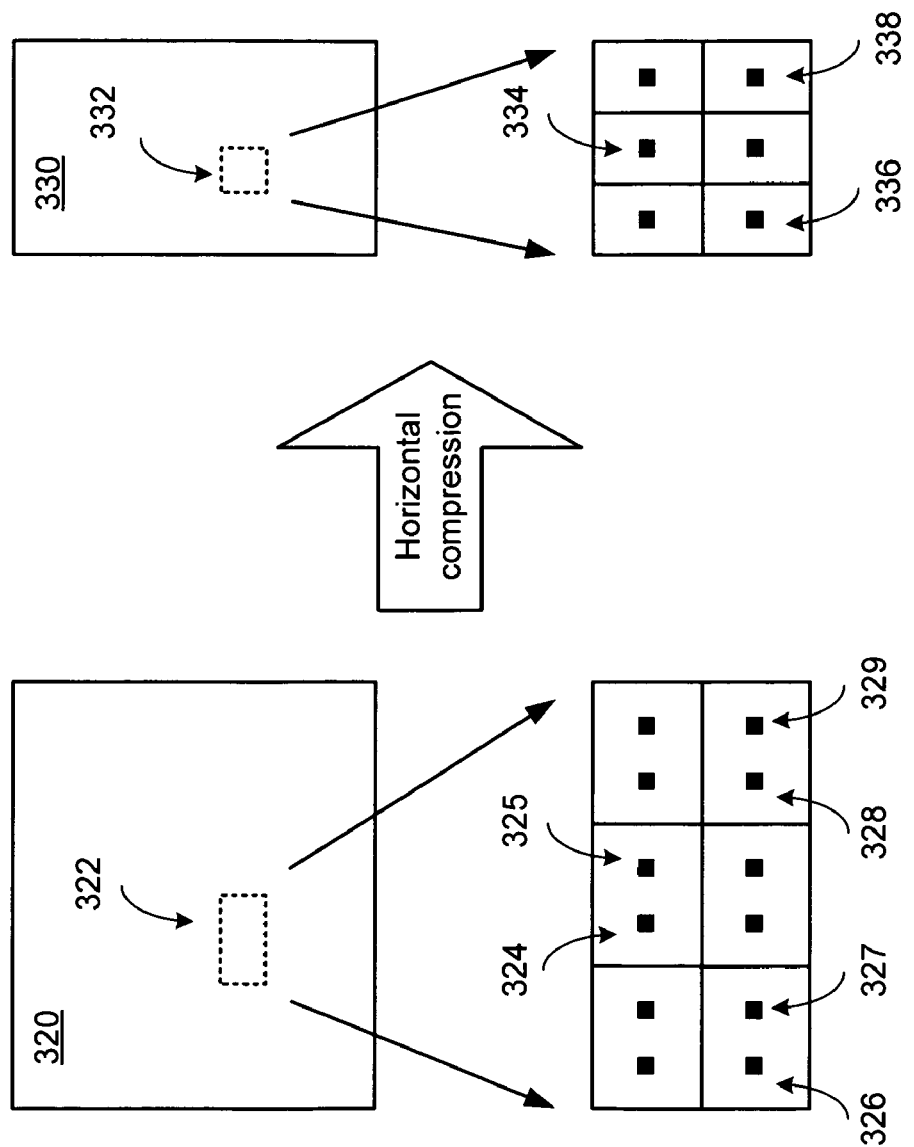
FIG. 6 presents a graphical representation that shows an example compression of a frame or field 320 of a video input signal into a horizontally compressed and vertically uncompressed frame or field 330.

FIG. 6 presents a graphical representation that shows an example compression of a frame or field 320 of a video input signal into a horizontally compressed and vertically uncompressed frame or field 330. When operating on a frame-to-frame basis, the horizontally compressed and vertically uncompressed current frame of the video input signal 110 includes a plurality of current frame pixels having corresponding current frame pixel values that are each based on an average value of a plurality of adjacent pixels in a row of the uncompressed current frame of the video input signal, and the horizontally compressed and vertically uncompressed reference frame of the video input signal include a plurality of reference frame pixels having corresponding reference frame pixel values that are each based on an average value of n adjacent pixels in a row of an uncompressed reference frame of the video input signal, wherein n is greater than one.

Similarly, when operating on a field-to-field basis, the horizontally compressed and vertically uncompressed current field of the video input signal include a plurality of current field pixels having corresponding current field pixel values that are each based on an average value of a plurality of adjacent pixels in a row of the uncompressed current field of the video input signal, and the horizontally compressed and vertically uncompressed reference field of the video input signal include a plurality of reference field pixels having corresponding reference field pixel values that are each based on an average value of n adjacent pixels in a row of an uncompressed reference field of the video input signal.

The example shows the compression of a frame or field 320 into a horizontally compressed and vertically uncompressed corresponding frame or field 330 using a compression factor of n=2. Referring to an expanded 6×2 portion 322 of field or frame 320, the pixel values of each two adjacent pixels in each row are averaged to form each single compressed pixel in expanded 3×2 portion 332 of compressed frame or field 330. For example, the pixel values of pixels 324 and 325 are averaged to form the pixel value of a single pixel 334, the pixel values of pixels 326 and 327 are averaged to form the pixel value of a single pixel 336, the pixel values of pixels 328 and 329 are averaged to form the pixel value of a single pixel 338, and so on. While a particular compression factor n=2 is shown for the purpose of illustration, other values of n may likewise be used in accordance with the present invention.

Figure 7:
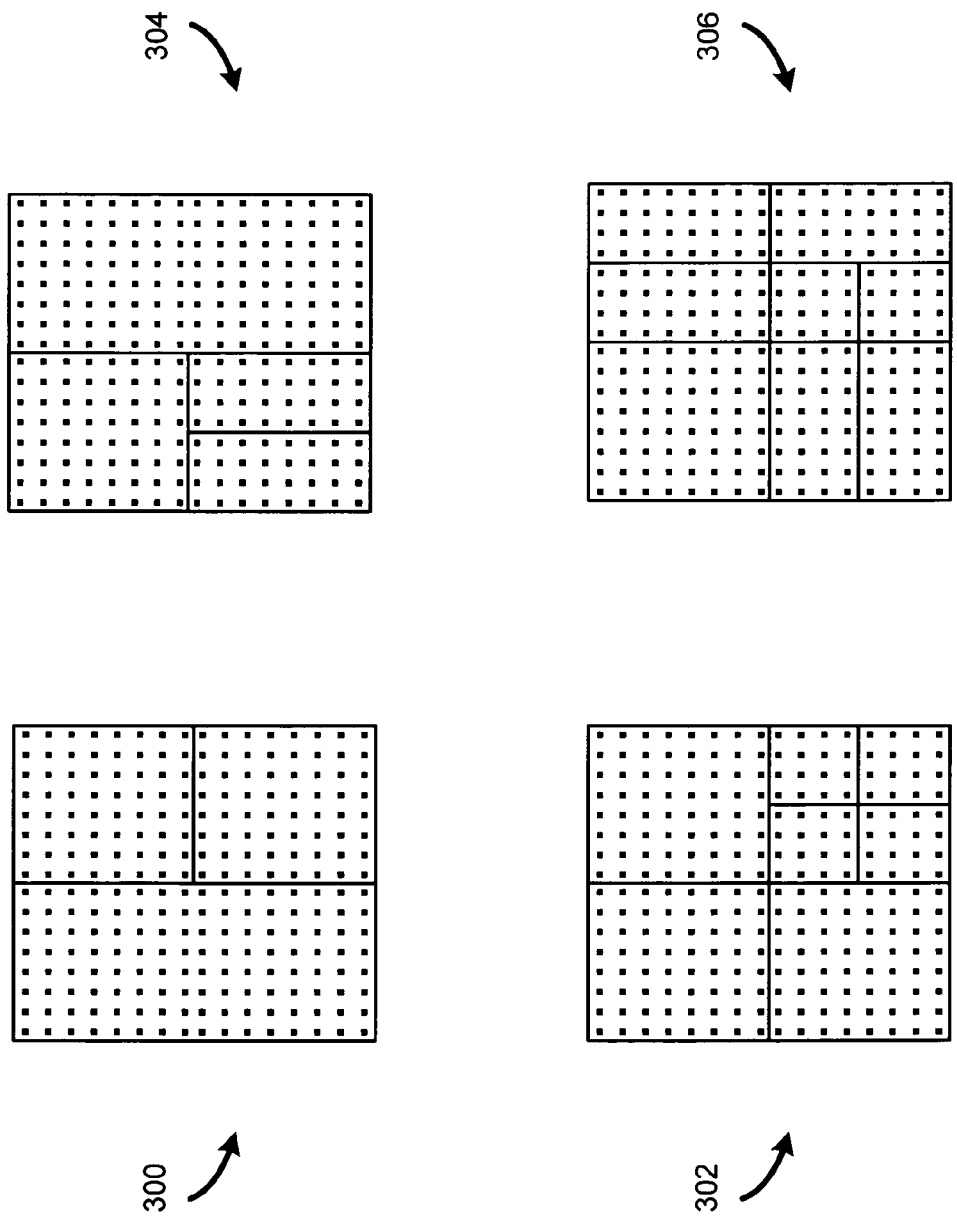
FIG. 7 presents a graphical representation of example partitionings of a macroblock of a video input signal into a plurality of subblocks.

FIG. 7 presents a graphical representation of example partitionings of a macroblock of a video input signal into a plurality of subblocks. In particular, while the modules described in conjunction with FIG. 5 above can operate on macroblocks having a size such as 16 pixels×16 pixels, such as in accordance with the H.264 standard, macroblocks can be partitioned into subblocks of smaller size, as small as 4 pixels on a side with the functions and features described in conjunction with the macroblocks applying to each subblock with individual pixel locations indicated by dots. Macroblock 302 represents an example of partitioning into subblocks in accordance with the H.264 standard. Macroblocks 300, 304 and 306 represent examples of other possible partitioning into subblocks. In particular, macroblock 300 is a 16×16 macroblock that is partitioned into an 8×16 subblock and two 8×8 subblocks. Macroblock 302 is a 16×16 macroblock that is partitioned into three 8×8 subblocks and four 4×4 subblocks. Macroblock 304 is a 16×16 macroblock that is partitioned into an 8×16 subblock, an 8×8 subblock and two 4×8 subblocks. Macroblock 306 is a 16×16 macroblock that is partitioned into an 8×8 subblock, three 4×8 subblocks, two 8×4 subblocks, and two 4×4 subblocks. The partitioning of the macroblocks into smaller subblocks increases the complexity of the motion compensation by requiring various compensation methods, such as the motion search to determine, not only the motion search motion vectors for each subblock, but the best motion vectors over the set of all possible partitions of a particular macroblock. The result however can yield more accurate motion compensation and reduced compression artifacts in the decoded video image.

Figure 8:
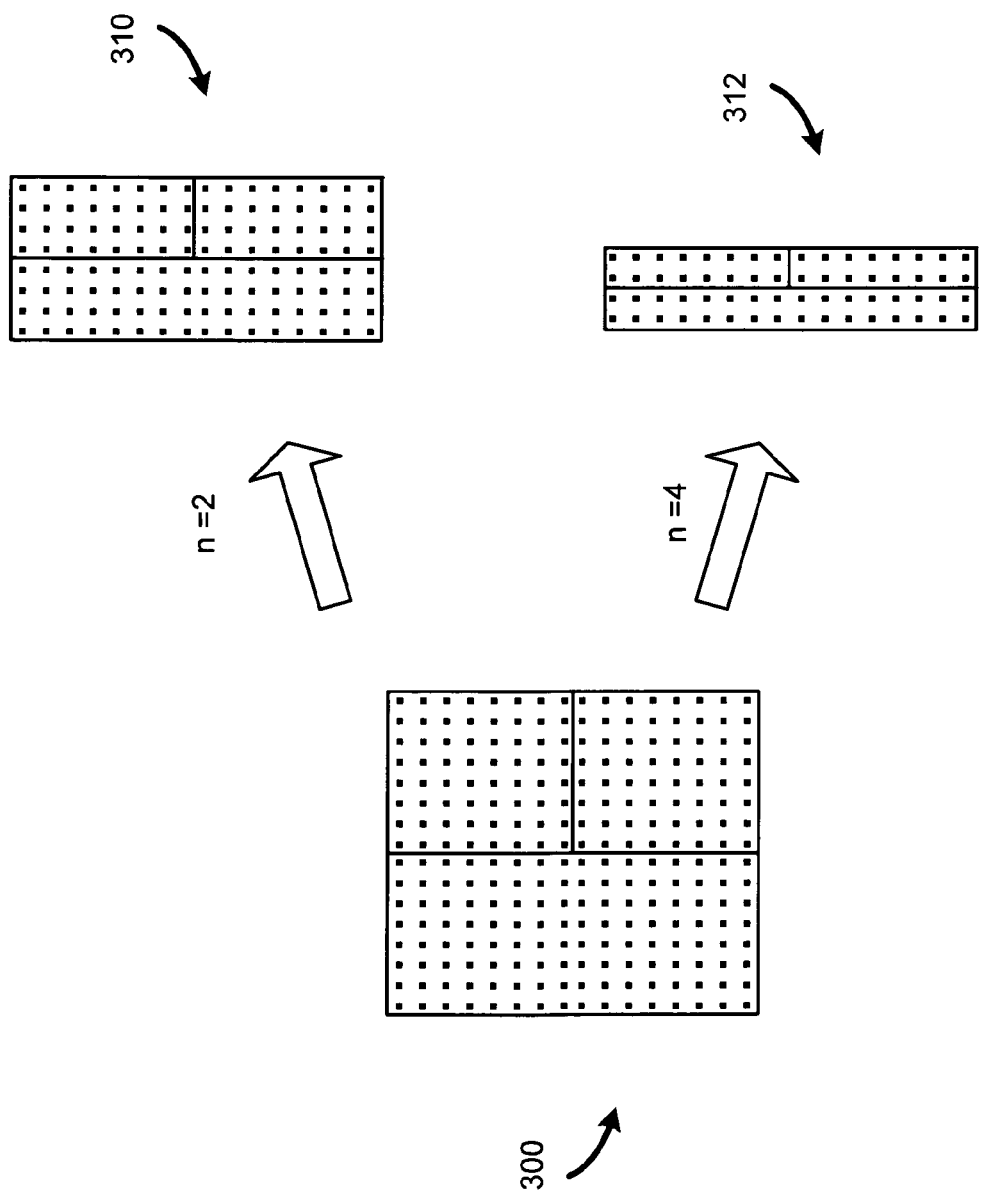
FIG. 8 presents a graphical representation that shows example compressions of a macroblock 300 of a video input signal into a horizontally compressed and vertically uncompressed macroblocks 310 and 312.

FIG. 8 presents a graphical representation that shows example compressions of a macroblock 300 of a video input signal into a horizontally compressed and vertically uncompressed macroblocks 310 and 312. The operation of motion search module 204 on frames or fields of video input signal 110 that are horizontally compressed by a compression factor n=2, is based on horizontally compressed macroblocks. As discussed above, the motion compensation module 150 segments the frame and/or field of the video input signal 110 into macroblocks that may be 16×16 wide, however, the horizontally compressed frames and fields used by motion search module 204 cause these macroblocks to be similarly compressed. Consider, for example, 16×16 macroblock 300. A horizontal compression with compression factor n=2, yields 8×16 macroblock 310 and a horizontal compression with compression factor n=4, yields 4×16 macroblock 312.

Considering the motion search macroblocks to have a horizontal dimension $x_{ms}$, and the motion refinement macroblocks to have a horizontal dimension $x_{mr}$, $x_{ms}=x_{mr}/n$, wherein n is a horizontal compression factor. In addition, considering the motion search macroblocks to have a vertical dimension $y_{ms}$, and the motion refinement macroblocks to have a horizontal dimension $y_{mr}$, $y_{ms}=y_{mr}$. Compressing the motion search macroblocks used by motion search module 204 in the same fashion as the compression of the frame or field from which it is derived allows the motion search macroblocks to have a one-to-one correspondence with the macroblocks used by the other modules of motion compensation module 150, and in particular, the motion refinement macroblocks used by motion refinement module 206 that operates from the motion search motion vector determined by motion search module 204.

Figure 9:
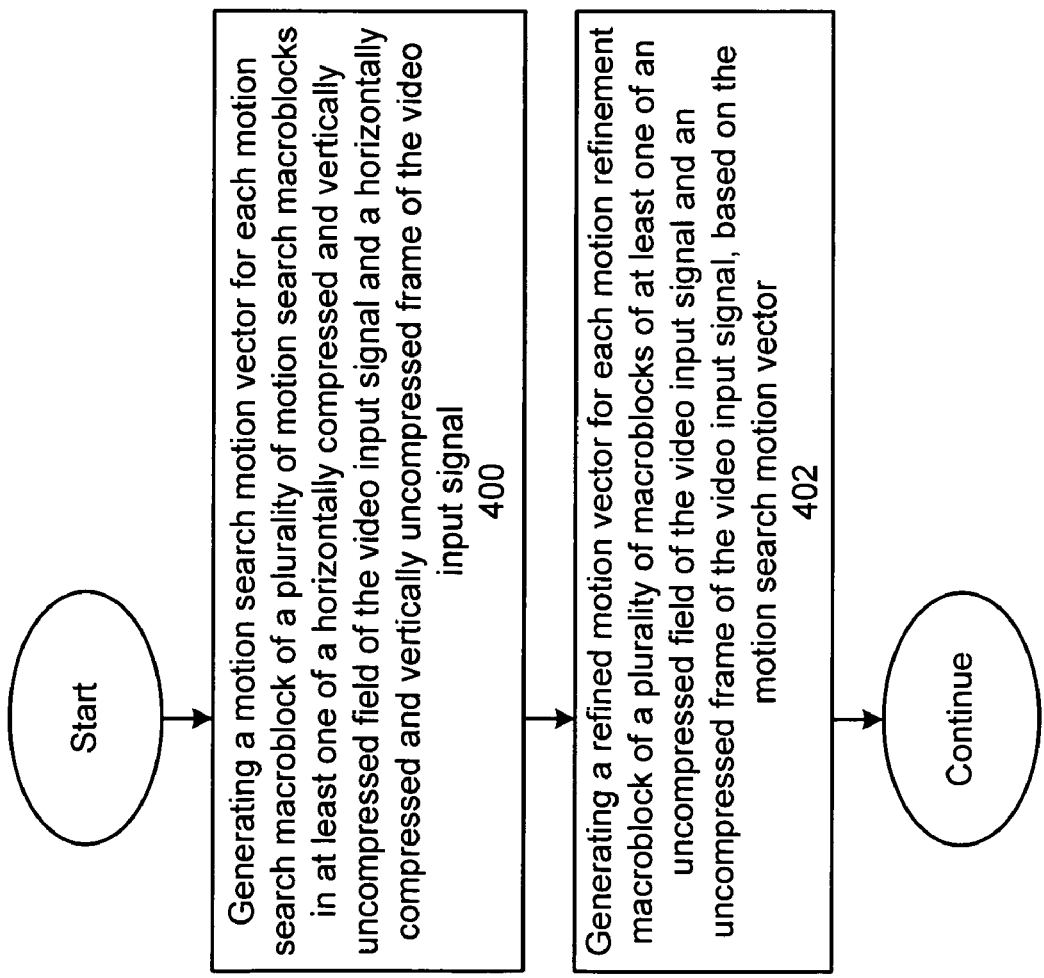
FIG. 9 presents a flowchart representation of a method in accordance with an embodiment of the present invention.

FIG. 9 presents a flowchart representation of a method in accordance with an embodiment of the present invention. In particular, a method is presented for use in conjunction with one or more of the features and functions described in association with FIGS. 1-8. In step 400 a motion search motion vector is generated for each motion search macroblock of a plurality of motion search macroblocks in at least one of a horizontally compressed and vertically uncompressed field of the video input signal and a horizontally compressed and vertically uncompressed frame of the video input signal. In step 402, a refined motion vector is generated for each motion refinement macroblock of a plurality of macroblocks of at least one of an uncompressed field of the video input signal and an uncompressed frame of the video input signal, based on the motion search motion vector.

In an embodiment of the present invention the motion search macroblocks have a horizontal dimension $x_{ms}$, the motion refinement macroblocks have a horizontal dimension $x_{mr}$, and $x_{ms}=x_{mr}/n$, wherein n is a horizontal compression factor. In addition, the motion search macroblocks have a vertical dimension $y_{ms}$, the motion refinement macroblocks have a horizontal dimension $y_{mr}$, and $y_{ms}=y_{mr}$. In addition, step 400 can evaluates a plurality of partitions of each motion search macroblock of the plurality of motion search macroblocks.

Step 400 can include generating the motion search motion vector for each motion search macroblock of the plurality of motion search macroblocks based on a horizontally compressed and vertically uncompressed current frame of the video input signal and a horizontally compressed and vertically uncompressed reference frame of the video input signal. Further, the horizontally compressed and vertically uncompressed current frame of the video input signal can include a plurality of current frame pixels having corresponding current frame pixel values that are each based on an average value of a plurality of adjacent pixels in a row of the uncompressed current frame of the video input signal, and the horizontally compressed and vertically uncompressed reference frame of the video input signal include a plurality of reference frame pixels having corresponding reference frame pixel values that are each based on an average value of n adjacent pixels in a row of an uncompressed reference frame of the video input signal, wherein n is greater than one.

Step 400 can include generating the motion search motion vector for each motion search macroblock of the plurality of motion search macroblocks based on a horizontally compressed and vertically uncompressed current field of the video input signal and a horizontally compressed and vertically uncompressed reference field of the video input signal. Further, the horizontally compressed and vertically uncompressed current field of the video input signal include a plurality of current field pixels having corresponding current field pixel values that are each based on an average value of a plurality of adjacent pixels in a row of the uncompressed current field of the video input signal, and the horizontally compressed and vertically uncompressed reference field of the video input signal include a plurality of reference field pixels having corresponding reference field pixel values that are each based on an average value of n adjacent pixels in a row of an uncompressed reference field of the video input signal, wherein n is greater than one.

Figure 10:
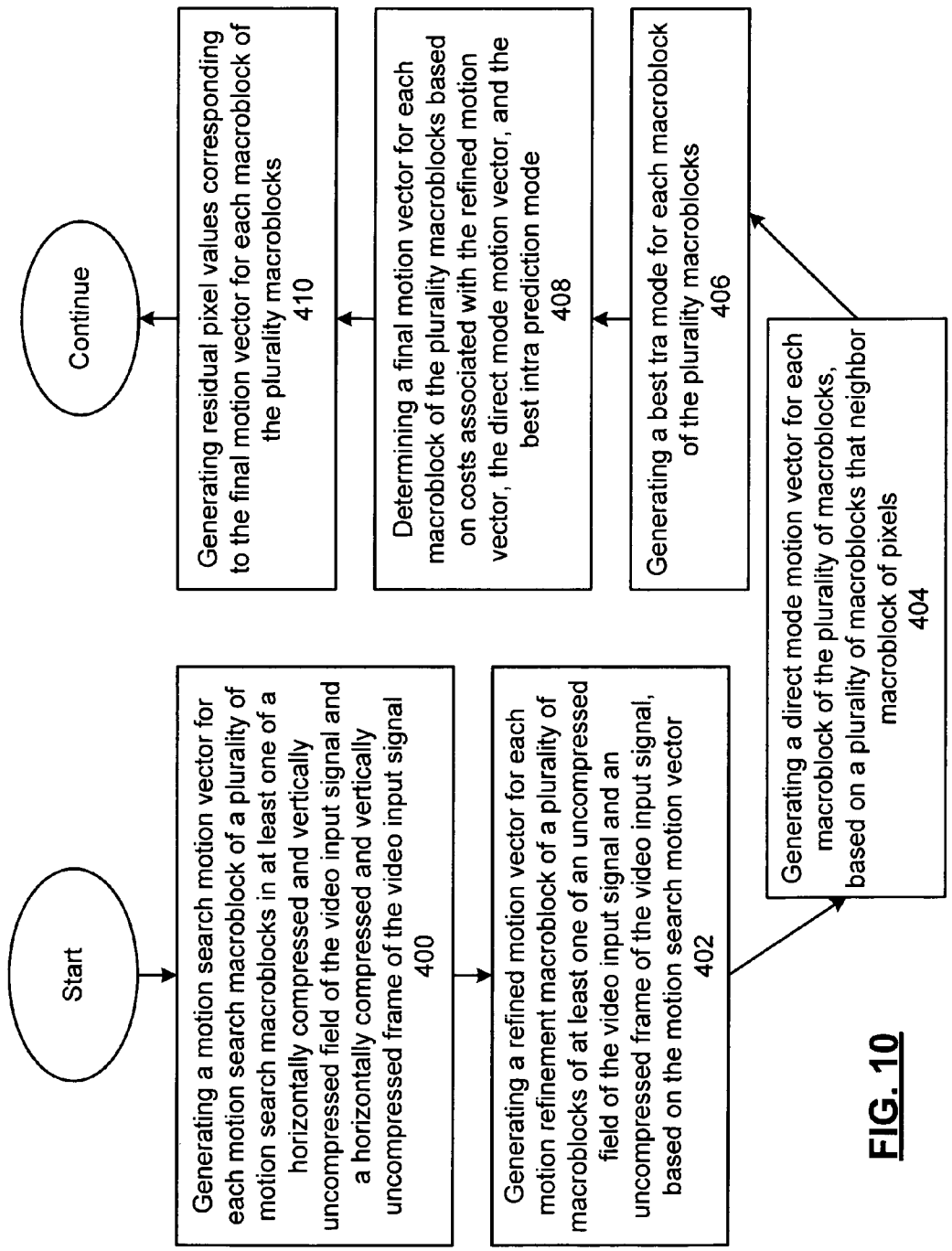
FIG. 10 presents a flowchart representation of a method in accordance with an embodiment of the present invention.

FIG. 10 presents a flowchart representation of a method in accordance with an embodiment of the present invention. A method is presented for use in conjunction with one or more of the features and functions described in association with FIGS. 1-9. In particular, a method is presented that includes steps from FIG. 9 that are referred to by common reference numerals. In addition, this method includes step 404 of generating a direct mode motion vector for each macroblock of the plurality of macroblocks, based on a plurality of macroblocks that neighbor the macroblock of pixels. In step 406, a best intra prediction mode is generated for each macroblock of the plurality of macroblocks. In step 408, a final motion vector is determined for each macroblock of the plurality of macroblocks based on costs associated with the refined motion vector, the direct mode motion vector, and the best intra prediction mode. In step 410 residual pixel values are generated corresponding to the final motion vector for each macroblock of the plurality of macroblocks.

In preferred embodiments, the various circuit components are implemented using 0.35 micron or smaller CMOS technology. Provided however that other circuit technologies, both integrated or non-integrated, may be used within the broad scope of the present invention.

As one of ordinary skill in the art will appreciate, the term "substantially" or "approximately", as may be used herein, provides an industry-accepted tolerance to its corresponding term and/or relativity between items. Such an industry-accepted tolerance ranges from less than one percent to twenty percent and corresponds to, but is not limited to, component values, integrated circuit process variations, temperature variations, rise and fall times, and/or thermal noise. Such relativity between items ranges from a difference of a few percent to magnitude differences. As one of ordinary skill in the art will further appreciate, the term "coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "coupled". As one of ordinary skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As the term module is used in the description of the various embodiments of the present invention, a module includes a functional block that is implemented in hardware, software, and/or firmware that performs one or module functions such as the processing of an input signal to produce an output signal. As used herein, a module may contain submodules that themselves are modules.

Thus, there has been described herein an apparatus and method, as well as several embodiments including a preferred embodiment, for implementing a video encoder and motion compensation module for use therewith. Various embodiments of the present invention herein-described have features that distinguish the present invention from the prior art.

It will be apparent to those skilled in the art that the disclosed invention may be modified in numerous ways and may assume many embodiments other than the preferred forms specifically set out and described above. Accordingly, it is intended by the appended claims to cover all modifications of the invention which fall within the true spirit and scope of the invention.

What is claimed is:

1. A motion compensation apparatus for use in a video encoder for encoding a video input signal, the motion compensation apparatus comprising:
    a motion search module, that performs a motion search to generate a motion search motion vector for each motion search macro block of a plurality of motion search macro blocks in at least one of: a horizontally compressed/vertically uncompressed field of the video input signal; and a horizontally compressed/vertically uncompressed frame of the video input signal; and
    a motion refinement module, coupled to the motion search module, that generates a refined motion vector for each motion refinement macroblock of a plurality of macroblocks of at least one of an uncompressed field of the video input signal and an uncompressed frame of the video input signal, based on the motion search motion vector.

2. The motion compensation apparatus of claim 1 wherein the motion search macro blocks have a horizontal dimension Xms the motion refinement macro blocks have a horizontal dimension Xmr, and Xms=Xmr/n, wherein n is a horizontal compression factor.

3. The motion compensation apparatus of claim 2 wherein the motion search macroblocks have a vertical dimension Yms, the motion refinement macroblocks have a horizontal dimension Ymr, and Yms=Ymr.

4. The motion compensation apparatus of claim 1 wherein the motion search module, generates the motion search motion vector for each motion search macroblock of the plurality of motion search macro blocks based on a horizontally compressed and vertically uncompressed current frame of the video input signal and a horizontally compressed and vertically uncompressed reference frame of the video input signal.

5. The motion compensation apparatus of claim 4 wherein the horizontally compressed and vertically uncompressed current frame of the video input signal include a plurality of current frame pixels having corresponding current frame pixel values that are each based on an average value of a plurality of adjacent pixels in a row of the uncompressed current frame of the video input signal, and the horizontally compressed and vertically uncompressed reference frame of the video input signal include a plurality of reference frame pixels having corresponding reference frame pixel values that are each based on an average value of n adjacent pixels in a row of an uncompressed reference frame of the video input signal, wherein n is greater than one.

6. The motion compensation apparatus of claim 1 wherein the motion search module, generates the motion search motion vector for each motion search macroblock of the plurality of motion search macro blocks based on a horizontally compressed and vertically uncompressed current field of the video input signal and a horizontally compressed and vertically uncompressed reference field of the video input signal.

7. The motion compensation apparatus of claim 6 wherein the horizontally compressed and vertically uncompressed current field of the video input signal include a plurality of current field pixels having corresponding current field pixel values that are each based on an average value of a plurality of adjacent pixels in a row of the uncompressed current field of the video input signal, and the horizontally compressed and vertically uncompressed reference field of the video input signal include a plurality of reference field pixels having corresponding reference field pixel values that are each based on an average value of n adjacent pixels in a row of an uncompressed reference field of the video input signal, wherein n is greater than one.

8. The motion compensation apparatus of claim 1 further comprising: a direct mode module, that generates a direct mode motion vector for each macroblock of the plurality of macroblocks, based on a plurality of macroblocks that neighbor the macro block of pixels; an intra-prediction module that generates a best intra prediction mode for each macro block of the plurality of macro blocks; and a mode decision module, coupled to the motion refinement module, the direct mode module and the prediction module, that determines a final motion vector for each macro block of the plurality of macro blocks based on costs associated with the refined motion vector, the direct mode motion vector, and the best intra prediction mode.

9. The motion compensation apparatus of claim 8 further comprising: a reconstruction module, coupled to the mode decision module, that generates residual pixel values corresponding to the final motion vector for each macro block of the plurality of macro blocks.

10. The motion compensation apparatus of claim 1 wherein the motion search module evaluates a plurality of partitions of each motion search macroblock of the plurality of motion search macroblocks.

11. A method for use in a video encoder for encoding a video input signal, method comprising:
    performs a motion search by generating a motion search motion vector for each motion search macro block of a plurality of motion search macro blocks in at least one of: a horizontally compressed/vertically uncompressed field of the video input signal; and a horizontally compressed/vertically uncompressed frame of the video input signal; and generating a refined motion vector for each motion refinement macroblock of a plurality of macro blocks of at least one of an uncompressed field of the video input signal and an uncompressed frame of the video input signal, based on the motion search motion vector.

12. The method of claim 11 wherein the motion search macroblocks have a horizontal dimension $x_{ms}$, the motion refinement macroblocks have a horizontal dimension $x_{mr}$, and $x_{ms}=x_{mr}/n$, wherein n is a horizontal compression factor.

13. The method of claim 12 wherein the motion search macroblocks have a vertical dimension $y_{ms}$, the motion refinement macroblocks have a horizontal dimension $y_{mr}$, and $y_{ms}=y_{mr}$.

14. The method of claim 11 wherein the step of generating the motion search motion vector generates the motion search motion vector for each motion search macroblock of the plurality of motion search macroblocks based on a horizontally compressed and vertically uncompressed current frame of the video input signal and a horizontally compressed and vertically uncompressed reference frame of the video input signal.

15. The method of claim 14 wherein the horizontally compressed and vertically uncompressed current frame of the video input signal include a plurality of current frame pixels having corresponding current frame pixel values that are each based on an average value of a plurality of adjacent pixels in a row of the uncompressed current frame of the video input signal, and the horizontally compressed and vertically uncompressed reference frame of the video input signal include a plurality of reference frame pixels having corresponding reference frame pixel values that are each based on an average value of n adjacent pixels in a row of an uncompressed reference frame of the video input signal, wherein n is greater than one.

16. The method of claim 11 wherein the step of generating the motion search motion vector generates the motion search motion vector for each motion search macroblock of the plurality of motion search macroblocks based on a horizontally compressed and vertically uncompressed current field of the video input signal and a horizontally compressed and vertically uncompressed reference field of the video input signal.

17. The method of claim 16 wherein the horizontally compressed and vertically uncompressed current field of the video input signal include a plurality of current field pixels having corresponding current field pixel values that are each based on an average value of a plurality of adjacent pixels in a row of the uncompressed current field of the video input signal, and the horizontally compressed and vertically uncompressed reference field of the video input signal include a plurality of reference field pixels having corresponding reference field pixel values that are each based on an average value of n adjacent pixels in a row of an uncompressed reference field of the video input signal, wherein n is greater than one.

18. The method of claim 11 further comprising:
generating a direct mode motion vector for each macro block of the plurality of macro blocks, based on a plurality of macro blocks that neighbor the macro block of pixels;
generating a best intra prediction mode for each macroblock of the plurality of macroblocks; and
determining a final motion vector for each macroblock of the plurality of macroblocks based on costs associated with the refined motion vector, the direct mode motion vector, and the best intra prediction mode.

19. The method of claim 18 further comprising:
generating residual pixel values corresponding to the final motion vector for each macroblock of the plurality of macroblocks.

20. The method of claim 18 wherein the step of generating the motion search motion vector evaluates a plurality of partitions of each motion search macroblock of the plurality of motion search macroblocks.

21. A motion compensation system for use in a video encoder for encoding a video input signal, the motion compensation system comprising:
a motion search module, that performs a motion search to generates a motion search motion vector for each motion search macro block of a plurality of motion search macro blocks in at least one of a field of the video input signal that is vertically uncompressed and horizontally compressed by a horizontal compression factor n, and frame of the video input signal that is vertically uncompressed and horizontally compressed by the horizontal compression factor n; and
a motion refinement module, coupled to the motion search module, that generates a refined motion vector for each motion refinement macroblock of a plurality of macroblocks of at least one of an uncompressed field of the video input signal and an uncompressed frame of the video input signal, based on the motion search motion vector;
wherein the motion search macroblocks have a horizontal dimension Xms, the motion refinement macroblocks have a horizontal dimension Xmr, and Xms=Xmr/n, and wherein the motion search macroblocks have a vertical dimension Yms, the motion refinement macroblocks have a horizontal dimension Ymr, and Yms=Ymr.

22. The motion compensation system of claim 21 wherein the motion search module, generates the motion search motion vector for each motion search macroblock of the plurality of motion search macro blocks based on a horizontally compressed and vertically uncompressed current frame of the video input signal and a horizontally compressed and vertically uncompressed reference frame of the video input signal.

23. The motion compensation system of claim 22 wherein the horizontally compressed and vertically uncompressed current frame of the video input signal include a plurality of current frame pixels having corresponding current frame pixel values that are each based on an average value of a plurality of adjacent pixels in a row of the uncompressed current frame of the video input signal, and the horizontally compressed and vertically uncompressed reference frame of the video input signal include a plurality of reference frame pixels having corresponding reference frame pixel values that are each based on an average value of n adjacent pixels in a row of an uncompressed reference frame of the video input signal, wherein n is greater than one.

24. The motion compensation system of claim 21 wherein the motion search module, generates the motion search motion vector for each motion search macroblock of the plurality of motion search macro blocks based on a horizontally compressed and vertically uncompressed current field of the video input signal and a horizontally compressed and vertically uncompressed reference field of the video input signal.

25. The motion compensation system of claim 24 wherein the horizontally compressed and vertically uncompressed current field of the video input signal include a plurality of current field pixels having corresponding current field pixel values that are each based on an average value of a plurality of adjacent pixels in a row of the uncompressed field of the video input signal, and the horizontally compressed and vertically uncompressed reference field of the video input signal include a plurality of current field pixels having corresponding current field pixel values that are each based on an average value of n adjacent pixels in a row of an uncompressed reference field of the video input signal, wherein n is greater than one.

26. The motion compensation system of claim 21 wherein the motion search module evaluates a plurality of partitions of each motion search macro block of the plurality of motion search macroblocks.

* * * * *